United States Patent
Xu

(10) Patent No.: US 9,600,081 B2
(45) Date of Patent: Mar. 21, 2017

(54) INFORMATION PROCESSING METHOD AND ELECTRONIC DEVICE FOR IMPROVING GESTURE IDENTIFICATION

(71) Applicants: BEIJING LENOVO SOFTWARE LTD., Beijing (CN); LENOVO (BEIJING) LIMITED, Beijing (CN)

(72) Inventor: Lin Xu, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 49 days.

(21) Appl. No.: 14/721,356

(22) Filed: May 26, 2015

(65) Prior Publication Data
US 2016/0162034 A1    Jun. 9, 2016

(30) Foreign Application Priority Data
Dec. 3, 2014  (CN) .......................... 2014 1 0725052

(51) Int. Cl.
| G09G 5/00 | (2006.01) |
| G06F 3/01 | (2006.01) |
| G01B 11/26 | (2006.01) |
| G06F 1/16 | (2006.01) |

(52) U.S. Cl.
CPC .............. G06F 3/017 (2013.01); G01B 11/26 (2013.01); G06F 1/1677 (2013.01)

(58) Field of Classification Search
CPC ............................ G06F 3/0416; G06F 3/0488
USPC ......................................................... 345/156
See application file for complete search history.

(56) References Cited

U.S. PATENT DOCUMENTS

2012/0319943 A1* 12/2012 Tamura ................. G06F 1/1647
                                                                345/156

* cited by examiner

*Primary Examiner* — Gustavo Polo
(74) *Attorney, Agent, or Firm* — Scully Scott Murphy & Presser

(57) ABSTRACT

The disclosure provides an information processing method and an electronic device using the same. The method comprises: when the electronic device is in a first operation mode in which there is a first angle between a first body and a second body of the electronic device, acquiring first operation information of an operating object, the first operation information including at least a first angle; acquiring a predefined correspondence relationship set; matching the acquired first angle with a first relationship in the relationship set to obtain a first matching result; and outputting the first matching result. The disclosure also provides an electronic device.

8 Claims, 6 Drawing Sheets

INFORMATION PROCESSING METHOD AND ELECTRONIC DEVICE FOR IMPROVING GESTURE IDENTIFICATION

This application claims priority from CN Patent Application No. 201410725052.5, filed Dec. 3, 2014, which is incorporated herein by reference in its entirety.

TECHNICAL FIELD

The disclosure generally relates to the information processing technology and, more particularly, to an information processing method and an electronic device.

BACKGROUND

Electronic devices, such as notebook computers, personal digital assistants (PDAs), etc., have penetrated extensively into our everyday life. A notebook computer has two bodies: a first body being a panel on which a display unit exists; and a second body being a panel on which a keyboard exists. As the postures of these two bodies change, a notebook mode, a tent mode, a tablet mode, a stand mode or the like may be achieved for the electronic device. When the electronic device is in the tent mode, there is a certain angle between the two bodies. Currently, a same operation has different process results in response to different angles between the first body and the second body.

SUMMARY

An embodiment of the disclosure provides an information processing method, comprising:

acquiring first operation information to an electronic device having a first angle between a first body and a second body of the electronic device, the first operation information including at least the first angle;

acquiring a predefined relationship set;

matching the acquired first angle with a selected first relationship in the relationship set to obtain a first matching result; and outputting the first matching result.

Another embodiment of the disclosure provides an electronic device. The electronic device comprises:

a first acquiring unit configured to acquire first operation information of an operating object having a first angle between a first body and a second body of the electronic device, the first operation information including at least the first angle;

a second acquiring unit configured to acquire a predefined relationship set;

a first matching unit configured to match the acquired first angle with a selected first relationship in the relationship set to obtain a first matching result; and a first outputting unit configured to output the first matching result.

DETAILED DESCRIPTION OF EMBODIMENTS

In the following, preferred embodiments of the disclosure will be described in conjunction with drawings. It should be appreciated that the preferred embodiments described in the following are only used for illustrating and explaining rather than limiting the disclosure.

In the information processing method and electronic device according to the embodiments of the disclosure, electronic devices that are involved include but are not limited to various kinds of computers (such as notebook computers, personal digital assistants, personal computers, all-in-one computers, etc.), handsets, electronic readers and the like. Electronic devices preferred for the embodiments of the disclosure are notebook computers.

A first information processing method according to the embodiment of the present disclosure may be performed on an electronic device being capable of operating in at least a first operation mode where there is a first angle between a first body and a second body of the electronic device. The first operation mode may be a tent mode. When the first body is a panel on which a display unit exists, the second body is a panel on which a keyboard exists. When the first body is the panel on which the keyboard exists, the second body is the panel on which the display unit exists. A certain first angle is needed between the first body and the second body, so that the electronic device is in the tent mode.

Figure 1:
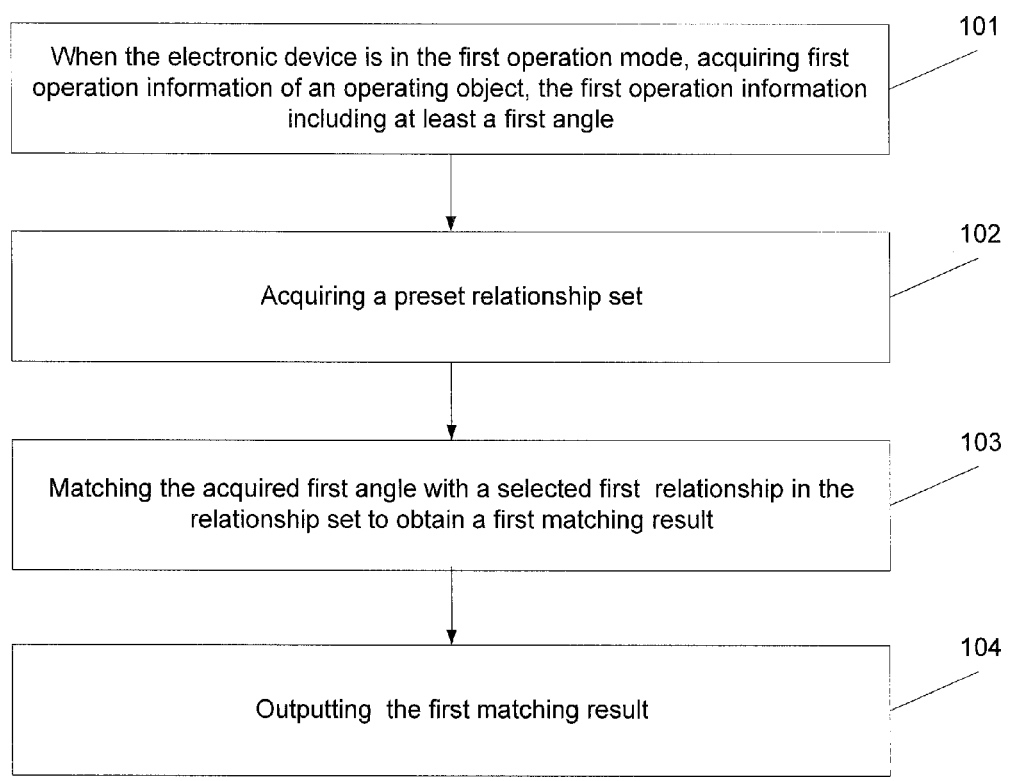
FIG. 1 shows a flowchart illustrating a first information processing method according to an embodiment of the disclosure.

FIG. 1 is a flowchart illustrating the first information processing method according to the embodiment of the disclosure. As illustrated, the method comprises:

at step 101, when the electronic device is in the first operation mode, acquiring first operation information of an operating object, the first operation information including at least a first angle.

Here, the electronic device further comprises a capturing unit. Typically, the capturing unit and the display unit are on the same plane. The capturing unit may be a 2D camera or a 3D camera. The operating object may be a first part of a user, and the first part may be a hand. At this step, when the electronic device is in the tent mode, a gesture operation made by the user relative to the electronic device is acquired by the capturing unit.

At step 102, a predefined relationship set is acquired.

Here, if all first angles that keep the electronic device well in the tent mode are referred as ideal angles, then a relationship set which comprises at least M first relationships (M being a positive integer) is prestored in the electronic device. The relationship set may be used to at least represent correspondence relationships. Each of relationships associates a respective one of the ideal angles with the gesture characteristics and/or associates a respective one of the ideal angles with a first characteristic parameter ratio of the respective ideal angle to a first predetermined angle. The first predetermined angle is an angle selected from the ideal angles according to practical applications.

Figure 2:
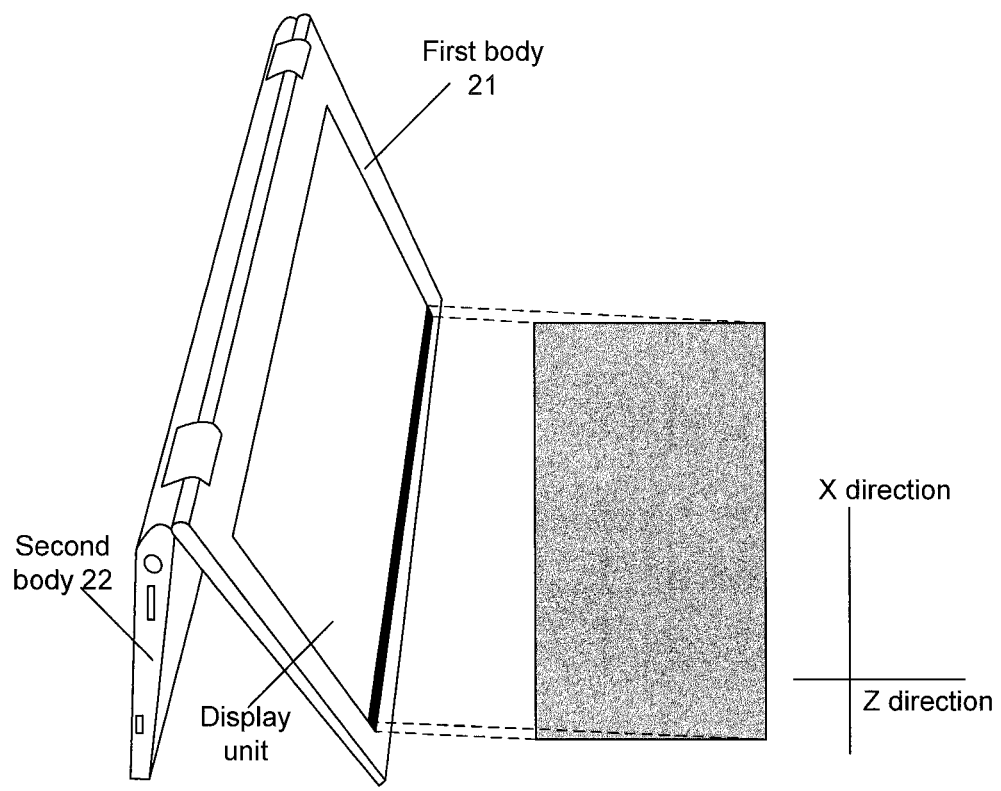
FIG. 2 shows a diagram illustrating an electronic device being in a tent mode according to an embodiment of the disclosure.

FIG. 2 shows a diagram illustrating an electronic device being in a tent mode according to an embodiment of the disclosure. In FIG. 2, a first body 21 includes a display unit and a second body 22 does not include a display unit. A capturing unit is arranged at a position in (for example at the center of) an area under the display unit (shown as the black region in the figure). The gray region in the figure is a scope where the capturing unit can collect a gesture operation. A direction perpendicular to the display unit is referred as Z direction, and a direction parallel to the display unit is referred as X direction. In this solution, the electronic device is arranged such that the angle between the first body and the second body is adjusted to N ideal angles in the tent mode one by one. At each of the N ideal angles, all gestures are collected by the capturing unit, gesture characteristics (such as profiles, shapes, etc.) are identified, and a relationship associating the ideal angle with the gesture characteristics or a relationship among the ideal angle, the gestures and the gesture characteristics is stored. As such, a relationship set is created. Additionally or alternatively, when there is a first predetermined angle between the first body 21 and the second body 22, an object (such as a square object) is placed along the Z direction and the length of the square object along the Z direction is calculated as Z. Then, the angle between the first body 21 and the second body 22 is changed to the ideal angles. At each of the ideal angles, the length of the square object along the Z direction is calculated as Z'. Z/Z' is a first characteristic parameter ratio (distortion factor). Relationships between the ideal angles and their respective Z/Z' ratios are stored. The relationship between each of the ideal angles and the respective gesture characteristics is prestored mainly for addressing the problem that different angles between the first body and the second body cause incorrect identification of the same gesture. The relationship between each of the ideal angles and the respective Z/Z' ratio is prestored mainly for addressing the problem that different angles between the first body and the second body and a movement of the user's gesture along the Z direction tend to cause incorrect identification of the same moving gesture.

At step 103, the acquired first angle is matched with a first relationship in the relationship set to obtain a first matching result.

Here, because the relationship between each of the ideal angles and the respective gesture characteristics at the ideal angle and/or the relationship between each of the ideal angles and the respective first parameter ratio are prestored, a first relationship in the relationship set is determined based on the acquired first angle. From the determined first relationship, a gesture characteristic or the first parameter ratio at the first angle is determined.

At step 104, the first matching result is output.

Here, taking the determination of the gesture characteristic at the first angle as an example, the electronic device determines the acquired first gesture information as a gesture operation having the gesture characteristic, obtains a responsive result in response to the gesture operation, and outputs the responsive result.

Thus, in the embodiment of the disclosure, a relationship set is predefined. By matching a first angle between a first body and a second body with a first relationship in the relationship when the first angle is acquired, it is determined which gesture operation is made by a user on an electronic device at the first angle. As such, the efficiency of gesture identification is improved. Accordingly, the problem that different angles between the first body and the second body cause different responses to the same gesture is addressed.

A second information processing method according to the embodiment of the disclosure may be performed on an electronic device being capable of operating in at least a first operation mode where there is a first angle between a first body and a second body of the electronic device. The first operation mode may be a tent mode. When the first body is a panel on which a display unit exists, the second body is a panel on which a keyboard exists. When the first body is the panel on which the keyboard exists, the second body is the panel on which the display unit exists. A certain first angle is needed between the first body and the second body, so that the electronic device is in the tent mode.

Figure 3:
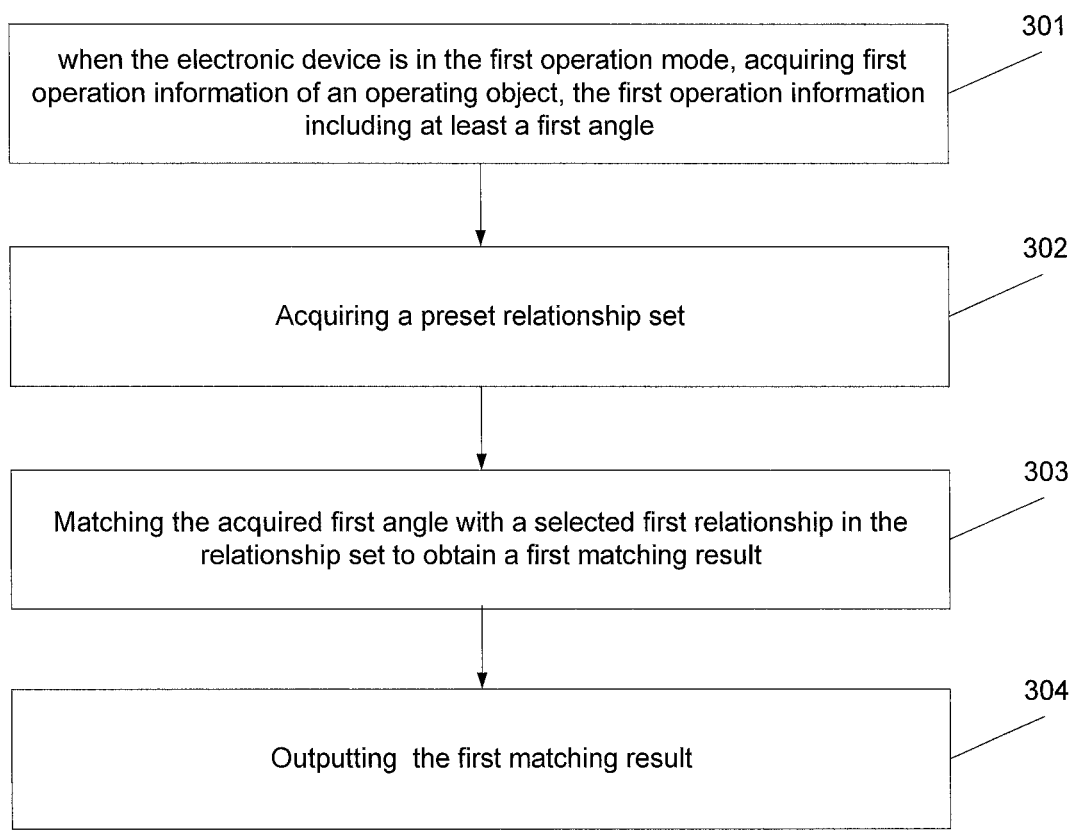
FIG. 3 shows a flowchart illustrating a second information processing method according to an embodiment of the disclosure.

FIG. 3 shows a flowchart illustrating the second information processing method according to the embodiment of the disclosure. As illustrated, the method comprises:

at step 301, when the electronic device is in the first operation mode, acquiring first operation information of an operating object, the first operation information including at least a first angle.

Here, the electronic device further comprises a capturing unit. Typically, the capturing unit and the display unit are on the same plane. The capturing unit may be a 2D camera or a 3D camera. The operating object may be a first part of a user, and the first part may be a hand. At this step, when the electronic device is in the tent mode, a gesture operation made by the user relative to the electronic device is acquired by the capturing unit.

At step 302, a predefined relationship set is acquired.

Here, if all first angles that keep the electronic device well in the tent mode are referred as ideal angles, then a relationship set which comprises at least M first relationships (M being a positive integer) is prestored in the electronic device. The relationship set may comprise relationships each of which associating a respective one of the ideal angles with the gesture characteristics at the respective ideal angle.

FIG. 2 is a diagram illustrating an electronic device being in a tent mode according to an embodiment of the disclosure. In FIG. 2, a first body 21 includes a display unit and a second body 22 does not include a display unit. A capturing unit is arranged at a position in (for example at the center of) an area under the display unit (shown as the black region in the figure). The gray region in the figure is a scope where the capturing unit can collect a gesture operation. The electronic device is arranged such that the angle between the first body and the second body is adjusted to N ideal angles in the tent mode one by one. At each of the N ideal angles, all gestures are collected by the capturing unit, gesture characteristics (such as profiles, shapes, etc.) are identified, and a relationship between the ideal angle and the gesture characteristics or a relationship among the ideal angle, the gestures and the gesture characteristics is stored. As such, a relationship set is created. The relationship between each of the ideal angles and the respective gesture characteristics is prestored mainly for addressing the problem that different angles between the first body and the second body cause incorrect identification of the same gesture.

At step 303, the acquired first angle is matched with a first relationship in the relationship set to obtain a first matching result.

Here, because the relationship between each of the ideal angles and the respective gesture characteristics at the ideal angle is prestored, a first relationship in the relationship set is determined based on the acquired first angle. From the determined first relationship, a gesture characteristic at the first angle is determined.

When the relationship set comprises at least a set of relationships each of which associates a respective one of the M first angles with the gesture characteristics at the respective first angle, the step comprises:

acquiring an information attribute of the first operation information; acquiring first gesture information of the operating object, when the information attribute indicates that the first operation information is first information; determining a first relationship in the relationship set which matches the first angle in the first operation information; and determining, from the first relationship, a gesture which matches the first gesture information. To be more specific, a first angle corresponding to each of the first relationships in the relationship set is acquired to generate M first angles; one of the M first angles which has a minimum difference from the first angle in the first operation information is determined; the first relationship corresponding to the angle which has the minimum difference is determined as the first relationship that matches the first angle in the first operation information; from the first relationship that matches the first angle in the first operation information, a gesture characteristic whose similarity to the first gesture information exceeds a first predefined value is determined; a gesture having the gesture characteristic is determined as the gesture that matches the first gesture information; a first responsive result is obtained in response to the gesture having the gesture characteristic; and the first responsive result is output.

Here, a gesture involving a movement along the Z direction and a stationary gesture are typically different from each other in either profile or direction. Therefore, a profile or a direction of a first gesture operation is acquired. When the profile or the direction does not exceed a first predetermined threshold, the currently collected gesture is determined as a stationary gesture. Now, the first angle between the first body and the second body is a first target angle. Information (such as profile, direction, etc.) of the non-moving gesture at the first target angle is identified. From the M first angles stored in the relationship set, a first angle (a second target angle) which has a minimum difference from the first target angle is extracted. From the first relationship where the second target angle is stored, a gesture characteristic whose similarity to the shape, profile of the non-moving gesture exceeds a predefined value is determined. A gesture having the gesture characteristic is identified as the gesture input by the user, a responsive result is obtained in response to the gesture, and the responsive result is output. For example, when it is determined that the gesture currently input by the user is an unlock gesture, the electronic device is unlocked and a display interface after the unlocking of the electronic device is presented.

At step 304, the first matching result is output.

Here, taking the determination of the gesture characteristic at the first angle as an example, the electronic device determines the acquired first gesture information as a gesture operation having the gesture characteristic, obtains a responsive result in response to the gesture operation, and outputs the responsive result.

Thus, according to the embodiment of the disclosure, a relationship set is predefined. By matching a first angle between a first body and a second body with a first relationship in the relationship when the first angle is acquired, it is determined which gesture operation is made by a user on an electronic device at the first angle. The efficiency of gesture identification is improved.

A third information processing method according to the embodiment of the present disclosure may be performed on an electronic device being capable of operating in at least a first operation mode where there is a first angle between a first body and a second body of the electronic device. The first operation mode may be a tent mode. When the first body is a panel on which a display unit exists, the second body is a panel on which a keyboard exists. When the first body is the panel on which the keyboard exists, the second body is the panel on which the display unit exists. A certain first angle is needed between the first body and the second body, so that the electronic device is in the tent mode.

Figure 4:
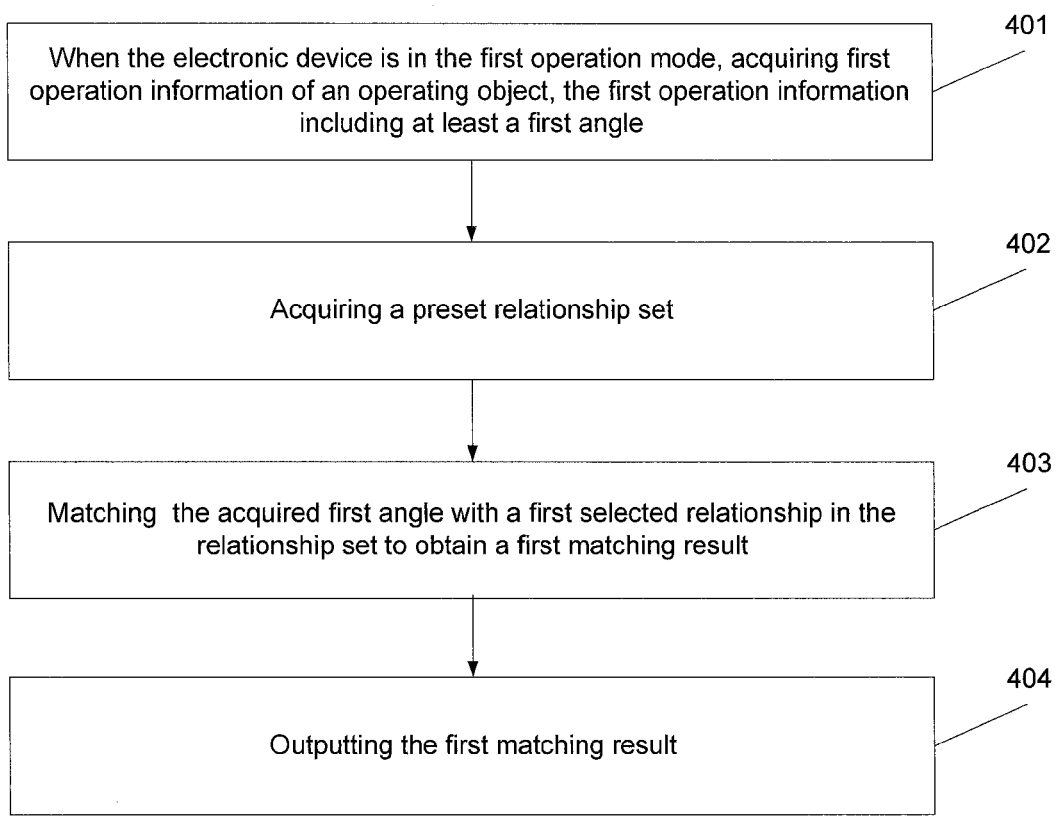
FIG. 4 shows a flowchart illustrating a second information processing method according to an embodiment of the disclosure.

FIG. 4 shows a flowchart illustrating the third information processing method according to the embodiment of the disclosure. As illustrated, the method comprises:

at step 401, when the electronic device is in the first operation mode, acquiring first operation information of an operating object, the first operation information including at least a first angle.

Here, the electronic device further comprises a capturing unit. Typically, the capturing unit and the display unit are on the same plane. The capturing unit may be a 2D camera or a 3D camera. The operating object may be a first part of a user, and the first part may be a hand. At this step, when the electronic device is in the tent mode, a gesture operation made by the user relative to the electronic device is acquired by the capturing unit.

At step 402, a predefined relationship set is acquired.

Here, if all first angles that keep the electronic device well in the tent mode are referred as ideal angles, then a relationship set which comprises at least M first relationships (M being a positive integer) is prestored in the electronic device. The relationship set may comprise at least the relationships each of which associating a respective one of the ideal angles with a first characteristic parameter ratio of the respective ideal angle to a first predetermined angle.

FIG. 2 is a diagram illustrating an electronic device being in a tent mode according to an embodiment of the disclosure. In FIG. 2, a first body 21 includes a display unit and a second body 22 does not include a display unit. A capturing unit is arranged at a position in (for example at the center of) an area under the display unit (shown as the black region in the figure). The gray region in the figure is a scope where the capturing unit can collect a gesture operation. A direction perpendicular to the display unit is referred as Z direction, and a direction parallel to the display unit is referred as X direction. In this solution, when there is a first predetermined angle between the first body 21 and the second body 22, an object (such as a square object) is placed along the Z direction and the length of the square object along the Z direction is calculated as Z. Then, the angle between the first body 21 and the second body 22 is changed to the ideal angles. At each of the ideal angles, the length of the square object along the Z direction is calculated as Z'. Z/Z' is a first characteristic parameter ratio (distortion factor). The relationship between each of the ideal angles and the respective Z/Z' ratio is stored. The relationship between each of the ideal angles and the respective Z/Z' ratio is prestored mainly for addressing the problem that different angles between the first body and the second body and a movement of the user's gesture along the Z direction tend to cause incorrect identification of the same moving gesture. The length of the square object along the Z direction at an ideal angle is calculated by calculating a distance between the farthest point on the square object (which is farthest from the display unit in the Z direction) and the display unit as a first distance, calculating a distance between the nearest point on the square object (which is closest to the display unit in the Z direction) and the display unit as a second distance and determining a difference between the first distance and the second distance.

At step 403, the acquired first angle is matched with a first relationship in the relationship set to obtain a first matching result.

When the relationship set comprises at least a set of relationships each of which associates a respective one of the M first angles with a characteristic parameter ratio of the respective first angle to a first predetermined angle, the step further comprises:

acquiring an information attribute of the first operation information; acquiring a first movement parameter of the operating object, when the information attribute indicates that the first operation information is second information; determining a first relationship in the relationship set which matches the first angle in the first operation information; and calibrating the first movement parameter based on the first relationship. To be more specific, a first angle corresponding to each of the first relationships in the relationship set is acquired to generate M first angles; one of the M first angles which has a minimum difference from the first angle in the first operation information is determined; the first relationship corresponding to the angle which has the minimum difference is determined as the first relationship that matches the first angle in the first operation information; a first characteristic parameter ratio is determined from the first relationship which matches the first angle in the first operation information; a first calculation is performed on the acquired first movement parameter and the first characteristic parameter ratio to calibrate the first movement parameter.

Here, a gesture involving a movement along the Z direction and a stationary gesture are typically different from each other in either profile or direction. Therefore, a profile or a direction of a first gesture operation is acquired. When the profile or the direction exceeds a first predetermined threshold, the currently collected gesture is determined as a gesture involving a movement along the Z direction (i.e., a moving gesture). Now, the angle between the first body and the second body is a first target angle. The distance over which the gesture moves along the Z direction at the first target angle is acquired as A. From the M first angles stored in the relationship set, a first angle (a second target angle) which has a minimum difference from the first target angle is extracted. A first characteristic parameter ratio Z/Z' corresponding to the second target angle is extracted. By calculating A*Z/Z'=C, the first movement parameter A is calibrated. Conventionally, a user's gesture which moves a distance A along the Z direction is prone to be identified incorrectly, because the distance A is not calibrated. According to the embodiment of the disclosure, the calibrated distance C is obtained by finding the second target angle in the relationship set and calibrating the distance A based on the Z/Z' corresponding to the second target angle. As such, it can be ensured that the possibility of correct identification of a gesture is improved when the gesture is at different distances from the display unit in the Z direction, so that the electronic device can output a correct gesture identification result. The distance A over which the moving gesture moves along the Z direction at a third angle is obtained by calculating a distance between the gesture and the display unit before the movement as a third distance, calculating a distance between the gesture and the display unit after the movement as a fourth distance and determining an absolute difference between the third distance and the fourth distance.

At step 404, the first matching result is output.

Here, the calibration of the distance A along the Z direction makes it convenient for the user to control the electronic device by making a gesture. When a gesture which is at the distance C from the display unit in the Z direction is identified as a first gesture, a responsive result is output in response to the first gesture.

Thus, according to the embodiment of the disclosure, a relationship set is predefined. By matching a first angle between a first body and a second body with a first relationship in the relationship set when the first angle is acquired, a first characteristic parameter ratio of a moving gesture at the first angle is determined and the distance over which the gesture moves along the Z direction is calibrated based on the first characteristic parameter ratio.

A first electronic device according to the embodiment of the disclosure is capable of operating in at least a first operation mode in which there is a first angle between a first body and a second body of the electronic device. The first operation mode may be a tent mode. When the first body is a panel on which a display unit exists, the second body is a panel on which a keyboard exists. When the first body is the panel on which the keyboard exists, the second body is the panel on which the display unit exists. A certain first angle is needed between the first body and the second body, so that the electronic device is in the tent mode.

Figure 5:
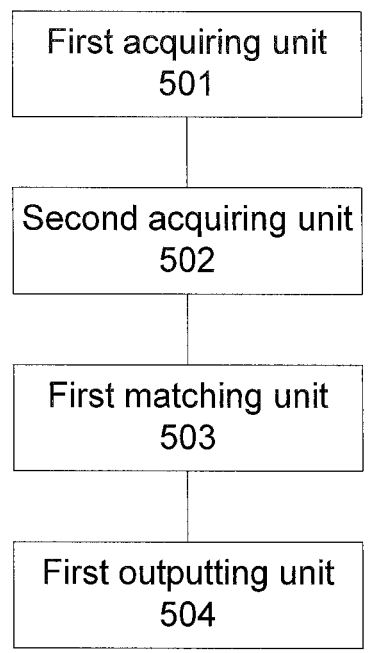
FIG. 5 shows a diagram illustrating a structure of a first electronic device according to an embodiment of the disclosure.

FIG. 5 shows a diagram illustrating a structure of the first electronic device according to the embodiment of the disclosure. As illustrated, the electronic device comprises a first acquiring unit 501, a second acquiring unit 502, a first matching unit 503 and a first outputting unit 504.

The first acquiring unit 501 is configured to acquire first operation information of an operating object when the electronic device is in the first operation mode, the first operation information including at least a first angle.

Here, the electronic device further comprises a capturing unit. Typically, the capturing unit and the display unit are on the same plane. The capturing unit may be a 2D camera or a 3D camera. The operating object may be a first part of a user, and the first part may be a hand. When the electronic device is in the tent mode, the first acquiring unit 501 may acquire a gesture operation made by the user relative to the electronic device by the capturing unit.

The second acquiring unit 502 is configured to acquire an information attribute of the first operation information.

Here, if all first angles that keep the electronic device well in the tent mode are referred as ideal angles, then a set which comprises at least M first relationships (M being a positive integer) is prestored in a storing unit (not shown in FIG. 5) of the electronic device. The relationship set may comprise at least relationships each of which associates a respective one of the ideal angles with the gesture characteristics at the respective ideal angle and/or at least comprise relationships each of which associates a respective one of the ideal angles with a first characteristic parameter ratio of the respective ideal angle to a first predetermined angle. The first predetermined angle is an angle selected from the ideal angles according to practical applications.

FIG. 2 shows a diagram illustrating an electronic device being in a tent mode according to an embodiment of the disclosure. In FIG. 2, a first body 21 includes a display unit and a second body 22 does not include a display unit. A capturing unit is arranged at a position in (for example at the center of) an area under the display unit (shown as the black region in the figure). The gray region in the figure is a scope where the capturing unit can collect a gesture operation. A direction perpendicular to the display unit is referred as Z direction, and a direction parallel to the display unit is referred as X direction. In this solution, the electronic device is arranged such that the angle between the first body and the second body is adjusted to N ideal angles in the tent mode one by one. At each of the N ideal angles, the first acquiring unit 501 collects all gestures by the capturing unit, identifies gesture characteristics (such as profiles, shapes, etc.), and triggers the storing unit to store a relationship between the ideal angle and the gesture characteristics or a relationship among the ideal angle, the gestures and the gesture characteristics. As such, a relationship set is created. Additionally or alternatively, when there is a first predetermined angle between the first body 21 and the second body 22, an object (such as a square object) is placed along the Z direction and the first acquiring unit 501 calculates the length of the square object along the Z direction as Z. Then, the angle between the first body 21 and the second body 22 is changed to the ideal angles. At each of the ideal angles, the first acquiring unit 501 calculates the length of the square object along the Z direction as Z', calculates a first characteristic parameter ratio (distortion factor) as Z/Z' and triggers the storing unit to store the relationship between each of the ideal angles and its respective Z/Z' ratio. The relationship between each of the ideal angles and the respective gesture characteristics is prestored mainly for addressing the problem that different angles between the first body and the second body cause incorrect identification of the same gesture. The relationship between each of the ideal angles and the respective Z/Z' ratio is prestored mainly for addressing the problem that different angles between the first body and the second body and a movement of the user's gesture along the Z direction tend to cause incorrect identification of the same moving gesture.

The matching unit 503 is configured to match the acquired first angle with a first relationship in the relationship set to obtain a first matching result.

Here, because the relationship between each of the ideal angles and the respective gesture characteristics at the ideal angle and/or the relationship between each of the ideal angles and the respective first parameter ratio are prestored in the storing unit, the first matching unit 503 determines a first relationship in the relationship set based on the acquired first angle. From the determined first relationship, a gesture characteristic and/or the first parameter ratio at the first angle is determined.

The outputting unit 504 is configured to output the first matching result.

Here, taking the determination of the gesture characteristic at the first angle as an example, the first matching unit 503 determines the acquired first gesture information as a gesture operation having the gesture characteristic, obtains a responsive result in response to the gesture operation, and triggers the first outputting unit 504 to output the responsive result.

Thus, according to the embodiment of the disclosure, a relationship set is predefined. By matching a first angle between a first body and a second body with a first relationship in the relationship when the first angle is acquired, it is determined which gesture operation is made by a user on an electronic device at the first angle. As such, the efficiency of gesture identification is improved.

A second electronic device according to the embodiment of the disclosure is able to operate in at least a first operation mode in which there is a first angle between a first body and a second body of the electronic device. The first operation mode may be a tent mode. When the first body is a panel on which a display unit exists, the second body is a panel on which a keyboard exists. When the first body is the panel on which the keyboard exists, the second body is the panel on which the display unit exists. A certain first angle is needed between the first body and the second body, so that the electronic device is in the tent mode.

Figure 6:
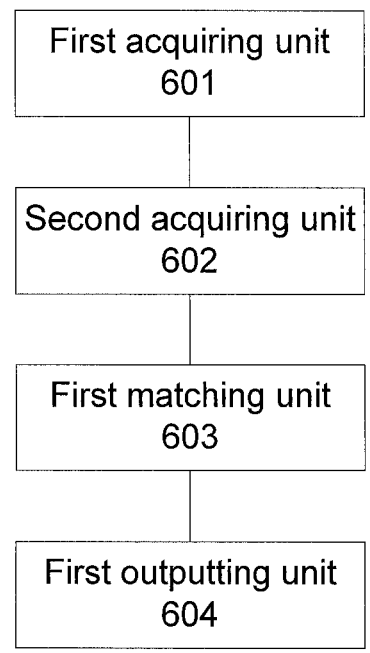
FIG. 6 shows a diagram illustrating a structure of a second electronic device according to an embodiment of the disclosure.

FIG. 6 shows a diagram illustrating a structure of the second electronic device according to the embodiment of the disclosure. As illustrated, the electronic device comprises a first acquiring unit 601, a second acquiring unit 602, a first matching unit 603 and a first outputting unit 604.

The first acquiring unit 601 is configured to acquire first operation information of an operating object when the electronic device is in the first operation mode, the first operation information including at least a first angle.

Here, the electronic device further comprises a capturing unit. Typically, the capturing unit and the display unit are on the same plane. The capturing unit may be a 2D camera or a 3D camera. The operating object may be a first part of a user, and the first part may be a hand. When the electronic device is in the tent mode, the first acquiring unit 601 may acquire a gesture operation made by the user relative to the electronic device by the capturing unit.

The second acquiring unit 602 is configured to acquire an information attribute of the first operation information.

Here, if all first angles that keep the electronic device well in the tent mode are referred as ideal angles, then a relationship set which comprises at least M first relationships (M being a positive integer) is prestored in a storing unit (not shown in FIG. 6) the electronic device. The relationship set may at least comprise relationships each of which associates a respective one of the ideal angles with the gesture characteristics at the respective ideal angle.

FIG. 2 is a diagram illustrating an electronic device being in a tent mode according to an embodiment of the disclosure. In FIG. 2, a first body 21 includes a display unit and a second body 22 does not include a display unit. A capturing unit is arranged at a position in (for example at the center of) an area under the display unit (shown as the black region in the figure). The gray region in the figure is a scope where the capturing unit can collect a gesture operation. In this solution, the electronic device is arranged such that the angle between the first body and the second body is adjusted to N ideal angles in the tent mode one by one. At each of the N ideal angles, the first acquiring unit 501 collects all gestures are collected by the capturing unit, identifies gesture characteristics (such as profiles, shapes, etc.), and triggers the storing unit to store a relationship between the ideal angle and the gesture characteristics or a relationship among the ideal angle, the gestures and the gesture characteristics is stored. As such, a relationship set is created. The relationship between each of the ideal angles and the respective gesture characteristics is prestored mainly for addressing the problem that different angles between the first body and the second body cause incorrect identification of the same gesture.

The first matching unit 603 is configured to match the acquired first angle with a first relationship in the relationship set to obtain a first matching result.

Here, because the relationship between each of the ideal angles and the respective gesture characteristics at the ideal angle is prestored in the storing unit, the first matching unit 603 determines a first relationship in the relationship set based on the acquired first angle. From the determined first relationship, a gesture characteristic at the first angle is determined.

When the relationship set comprises at least a set of relationships each of which associates a respective one of the M first angles with the gesture characteristics at the respective first angle, the first acquiring unit 601 acquires an information attribute of the first operation information, and acquires first gesture information of the operating object when the information attribute indicates that the first operation information is first information. The first matching unit 603 determines a first relationship in the relationship set which matches the first angle in the first operation information, and determines, from the first relationship, a gesture which matches the first gesture information. To be more specific, the first matching unit 603 acquires a first angle corresponding to each of the first relationships in the relationship set to generate M first angles, determines one of the M first angles which has a minimum difference from the first angle in the first operation information, determines the first relationship corresponding to the angle which has the minimum difference as the first relationship that matches the first angle in the first operation information, determines, from the first relationship that matches the first angle in the first operation information, a gesture characteristic whose similarity to the first gesture information exceeds a first predefined value, determines a gesture having the gesture characteristic as the gesture that matches the first gesture information, obtains a first responsive result in response to the gesture having the gesture characteristic, and triggers the first outputting unit 604 to output the first responsive result.

Here, a gesture involving a movement along the Z direction and a stationary gesture are typically different from each other in either profile or direction. Therefore, the first acquiring unit 601 acquires a profile or a direction of a first gesture operation. When the profile or the direction does not exceed a first predetermined threshold, the currently collected gesture is determined as a stationary gesture. Now, the first angle between the first body and the second body is a first target angle. The first acquiring unit 601 identifies Information (such as profile, direction, etc.) of the non-moving gesture at the first target angle, and notifies the second acquiring unit 602 to read the relationship set stored in the storing unit and to transmit the same to the first matching unit 603. The first matching unit 603 extracts, from the M first angles stored in the relationship set, a first angle (a second target angle) which has a minimum difference from the first target angle, determines, from the first relationship where the second target angle is stored, a gesture characteristic whose similarity to the shape, profile of the non-moving gesture exceeds a predefined value, identifies a gesture having the gesture characteristic as the gesture input by the user, obtains a responsive result in response to the gesture, and triggers the first outputting unit 604 to output the responsive result. For example, when it is determined that the gesture currently input by the user is an unlock gesture, the electronic device is unlocked and a display interface after the unlocking of the electronic device is presented.

The first outputting unit 604 is configured to output the first matching result.

Here, taking the determination of the gesture characteristic at the first angle as an example, the first matching unit 603 determines the acquired first gesture information as a gesture operation having the gesture characteristic, obtains a responsive result in response to the gesture operation, and triggers the first outputting unit 604 to output the responsive result.

Thus, according to the embodiment of the disclosure, a relationship set is predefined. By matching a first angle between a first body and a second body with a first relationship in the relationship when the first angle is acquired, it is determined which gesture operation is made by a user on an electronic device at the first angle. The efficiency of gesture identification is improved.

A third electronic device according to the embodiment of the disclosure is able to operate in at least a first operation mode where there is a first angle between a first body and a second body of the electronic device. The first operation mode may be a tent mode. When the first body is a panel on which a display unit exists, the second body is a panel on which a keyboard exists. When the first body is the panel on which the keyboard exists, the second body is the panel on which the display unit exists. A certain first angle is needed between the first body and the second body, so that the electronic device is in the tent mode.

Figure 7:
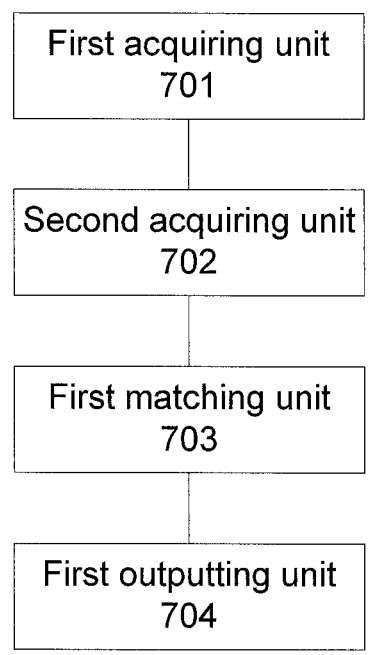
FIG. 7 shows a diagram illustrating a structure of a third electronic device according to an embodiment of the disclosure.

FIG. 7 shows a diagram illustrating a structure of the third electronic device according to the embodiment of the disclosure. As illustrated, the electronic device comprises a first acquiring unit 701, a second acquiring unit 702, a first matching unit 703 and a first outputting unit 704.

The first acquiring unit 701 is configured to acquire first operation information of an operating object when the electronic device is in the first operation mode, the first operation information including at least a first angle.

Here, the electronic device further comprises a capturing unit. Typically, the capturing unit and the display unit are on the same plane. The capturing unit may be a 2D camera or a 3D camera. The operating object may be a first part of a user, and the first part may be a hand. When the electronic device is in the tent mode, the first acquiring unit 701 may acquire a gesture operation made by the user relative to the electronic device by the capturing unit.

The second acquiring unit 702 is configured to acquire an information attribute of the first operation information.

Here, if all first angles that keep the electronic device well in the tent mode are referred as ideal angles, then a relationship set which comprises at least M first relationships (M being a positive integer) is prestored in a storing unit (not shown in FIG. 5) the electronic device. The relationship set may comprise at least relationships each of which associates a respective one of the ideal angles with a first characteristic parameter ratio of the respective ideal angle to a first predetermined angle.

FIG. 2 is a diagram illustrating an electronic device being in a tent mode according to an embodiment of the disclosure. In FIG. 2, a first body 21 includes a display unit and a second body 22 does not include a display unit. A capturing unit is arranged at a position in (for example at the center of) an area under the display unit (shown as the black region in the figure). The gray region in the figure is a scope where the capturing unit can collect a gesture operation. A direction perpendicular to the display unit is referred as Z direction, and a direction parallel to the display unit is referred as X direction. In this solution, when there is a first predetermined angle between the first body 21 and the second body 22, an object (such as a square object) is placed along the Z direction and the first acquiring unit 701 calculates the length of the square object along the Z direction as Z. Then, the angle between the first body 21 and the second body 22 is changed to the ideal angles. At each of the ideal angles, the first acquiring unit 501 calculates the length of the square object along the Z direction as Z', calculates a first characteristic parameter ratio (distortion factor) as Z/Z', and triggers the storing unit to store the relationship between each of the ideal angles and its respective Z/Z' ratio. The relationship between each of the ideal angles and the respective Z/Z' ratio is prestored mainly for addressing the problem that different angles between the first body and the second body and a movement of the user's gesture along the Z direction tend to cause incorrect identification of the same moving gesture. The first acquiring unit 701 calculates the length of the square object along the Z direction at an ideal angle by calculating a distance between the farthest point on the square object (which is farthest from the display unit in the Z direction) and the display unit as a first distance, calculating a distance between the nearest point on the square object (which is closest to the display unit in the Z direction) and the display unit as a second distance and determining a difference between the first distance and the second distance.

The first matching unit 703 is configured to match the acquired first angle with a first relationship in the relationship set to obtain a first matching result.

When the relationship set comprises at least a set of relationships each of which is between a respective one of the M first angles and a characteristic parameter ratio of the respective first angle to a first predetermined angle, the first acquiring unit 701 acquires an information attribute of the first operation information, and acquires a first movement parameter of the operating object when the information attribute indicates that the first operation information is second information. The first matching unit 703 determines a first relationship in the relationship set which matches the first angle in the first operation information, and calibrates the first movement parameter based on the first relationship. To be more specific, the first matching unit 703 acquires a first angle corresponding to each of the first relationships in the relationship set to generate M first angles, determines one of the M first angles which has a minimum difference from the first angle in the first operation information, determines the first relationship corresponding to the angle which has the minimum difference as the first relationship that matches the first angle in the first operation information, determines a first characteristic parameter ratio from the first relationship which matches the first angle in the first operation information, and performs a first calculation on the acquired first movement parameter and the first characteristic parameter ratio to calibrate the first movement parameter.

Here, a gesture involving a movement along the Z direction and a stationary gesture are typically different from each other in either profile or direction. Therefore, the first acquiring unit 701 acquires a profile or a direction of a first gesture operation. When the profile or the direction exceeds a first predetermined threshold, the currently collected gesture is determined as a gesture involving a movement along the Z direction (i.e., a moving gesture). Now, the angle between the first body and the second body is a first target angle. The distance over which the gesture moves along the Z direction at the first target angle is acquired as A. The first acquiring unit 701 notifies the second acquiring unit 702 to read the relationship set stored in the storing unit and to transmit the same to the first matching unit 703. The first matching unit 703 extracts, from the M first angles stored in the relationship set, a first angle (a second target angle) which has a minimum difference from the first target angle, extracts a first characteristic parameter ratio Z/Z' corresponding to the second target angle, and calculates A*Z/Z'=C to calibrate the first movement parameter A. Conventionally, a user's gesture which moves a distance A along the Z direction is prone to be identified incorrectly, because the distance A is not calibrated. According to the embodiment of the disclosure, the calibrated distance C is obtained by finding the second target angle in the relationship set and calibrating the distance A based on the Z/Z' corresponding to the second target angle using the first matching unit 703. As such, it can be ensured that the possibility of correct identification of a gesture is improved when the gesture is at different distances from the display unit in the Z direction, so that the electronic device can output a correct gesture identification result. The first acquiring unit 701 acquires the distance A over which the moving gesture moves along the Z direction at a third angle by calculating a distance between the gesture and the display unit before the movement as a third distance, calculating a distance between the gesture and the display unit after the movement as a fourth distance and determining an absolute difference between the third distance and the fourth distance.

The first outputting unit 704 is configured to output the first matching result.

Here, the calibration by the first matching unit 703 of the distance A along the Z direction makes it convenient for the user to control the electronic device by making a gesture. When a gesture which is at the distance C from the display unit in the Z direction is identified as a first gesture, a responsive result is obtained in response to the first gesture and the first outputting unit 704 is triggered to output the responsive result.

Thus, according to the embodiment of the disclosure, a relationship set is predefined. By matching a first angle between a first body and a second body with a first relationship in the relationship set when the first angle is acquired, a first characteristic parameter ratio of a moving gesture at the first angle is determined and the distance over which the gesture moves along the Z direction is calibrated based on the first characteristic parameter ratio.

As those skilled in the art will appreciate, the devices and the methods according to the embodiments of the disclosure may be implemented in other manners. The above-described device embodiments are for illustrative purposes only. For example, a device is divided into units simply based on their logical functions. In practical implementation, the device may be divided in other manners. For example, some units or components may be combined or may be incorporated into another system. Some features may be omitted or not implemented. In addition, couplings, direct couplings or commutation connections between the illustrated and described components may be achieved through some interfaces. Indirect couplings or communication connections between devices or units may be electrical, mechanical or in some other form.

The above units described as separate parts may or may not be separate physically. A part illustrated as a unit may or may not be a physical unit. That is, it may be located in a single place or distributed over a plurality of network units. According to practical demands, some or all of the units may be selected to achieve the objects of the embodiments.

In addition, the functional units in each of the embodiments of the disclosure may be integrated into a single processing unit, or each of the units may be implemented as a single unit, or two or more of the units may be integrated into a single unit. The integrated units may be implemented in hardware or in a combination of hardware and software function units.

As those skilled in the art will appreciate, all or some of the steps of the above method embodiments may be implemented by related hardware as instructed by programs. Such a program may be stored in a computer readable storage medium. When executed, the program performs the steps of the above method embodiments. The storage medium may be any kind of medium that can store program codes, such as a mobile storage device, a Read-Only Memory (ROM), a magnetic disc, an optical disc, etc.

The above contents are just detailed embodiments of the disclosure. The protection scope of the disclosure is not limited thereto. Changes or modifications that can be readily envisaged by those skilled in the art without departing from the scope of the disclosure are intended to be encompassed by the protection scope of the disclosure. Thus, the protection scope of the disclosure should be defined by the appended claims.

What is claimed is:

1. An information processing method, comprising:
acquiring first operation information of an electronic device having a first angle between a first body and a second body of the electronic device, the first operation information including at least the first angle;
acquiring a predefined relationship set;
matching the acquired first angle with a selected first relationship in the relationship set to obtain a first matching result; and
outputting the first matching result,
wherein the predefined relationship set comprises at least M first relationships, M being a positive integer, and the predefined relationship set comprises at least a set of relationships each of which associates a respective one of M first angles with gesture characteristics;
the method further comprising determining a first relationship in the relationship set which matches the first angle in the first operation information, comprising:
  acquiring the first angle corresponding to each of the first relationships in the relationship set to generate the M first angles;
  determining one of the M first angles which has a minimum difference from the first angle in the first operation information;
  determining the first relationship corresponding to the angle which has the minimum difference as the first relationship that matches the first angle in the first operation information;
  determining, from the first relationship that matches the first angle in the first operation information, a gesture characteristic whose similarity to a first gesture information exceeds a first predefined value;
  determining a gesture having the gesture characteristic as the gesture at matches the first gesture information;
  obtaining a first responsive result in response to the gesture having the gesture characteristic; and
  outputting the first responsive result.

2. The method according to claim 1, further comprising:
acquiring an information attribute of the first operation information;
acquiring the first gesture information of the electronic device, when the information attribute indicates that the first operation information is first information, and
wherein the matching the acquired first angle with the first relationship in the relationship set to obtain the first matching result comprises
determining, from the first relationship, the gesture which matches the first gesture information.

3. An information processing method, comprising:
acquiring first operation information of an electronic device having a first angle between a first body and a second body of the electronic device, the first operation information including at least the first angle;
acquiring a predefined relationship set;
matching the acquired first angle with a selected first relationship in the relationship set to obtain a first matching result; and
outputting the first matching result;
wherein the relationship set comprises at least M first relationships, M being a positive integer, and the relationship set comprises at least a set of relationships each of which is between a respective one of M first angles and a first characteristic parameter ratio of the respective first angle to a first predetermined angle, and the method further comprises:
acquiring an information attribute of the first operation information;
acquiring a first movement parameter of the electronic device, when the information attribute indicates that the first operation information is second information, and
wherein the matching the acquired first angle with the first relationship in the relationship set to obtain the first matching result comprises:
  determining a first relationship in the relationship set which matches the first angle in the first operation information; and
  calibrating the first movement parameter based on the first relationship.

4. The method according to claim 3, further comprising:
acquiring the first angle corresponding to each of the first relationships in the relationship set to generate the M first angles;
determining one of the M first angles which has a minimum difference from e first angle in the first operation information;
determining the first relationship corresponding to the angle which has the minimum difference as the first relationship that matches the first angle in the first operation information;
determining the first characteristic parameter ratio from the first relationship which matches the first angle in the first operation information; and
performing a first calculation on the acquired first movement parameter and the first characteristic parameter ratio to calibrate the first movement parameter.

5. An electronic device, comprising a hardware processor, wherein the hardware processor is configured to:
acquire first operation information of an operating mode having a first angle between a first body and a second body of the electronic device, the first operation information including at least the first angle;
acquire a predefined relationship set;
match the acquired first angle with a selected first relationship in the relationship set to obtain a first matching result; and
output the first matching result,
wherein the relationship set comprises at least M first relationships, M being a positive integer, and the relationship set comprises at least a set of relationships each associates a respective one of M first angles with gesture characteristics,
wherein the hardware processor is further configured to determine a first relationship in the relations set which matches the first angle in the first operation information by:
  acquiring the first angle corresponding to each of the first relationships in the relationship set to generate the M first angles;
  determining one of the M first angles which has a minimum difference from the first angle in the first operation information;

determining the first relationship corresponding to the angle which has the minimum difference as the first relationship that matches the first angle in the first operation information;

determining, from the first relationship that matches the first angle in the first operation information, a gesture characteristic whose similarity to the first gesture information exceeds a first predefined value;

determining a gesture having the gesture characteristic as the gesture that matches the first gesture information;

obtaining a first responsive result in response to the gesture having the gesture characteristic, and outputting the first responsive result.

6. The electronic device according to claim 5, wherein the hardware processor is further configured to:

acquire an information attribute of the first operation information;

acquire the first gesture information of the operating mode when the information attribute indicates that the first operation information is first information; and determine, from the first relationship, the gesture which matches the first gesture information.

7. An electronic device comprising a hardware processor, wherein the hardware processor is configured to:

acquire first operation information of an operating mode having a first angle between a first body and a second body of the electronic device the first operation information including at least the first angle;

acquire a predefined relationship set;

match the acquired first angle with a selected first relationship in the relationship set to obtain a first matching result; and output the first matching result, wherein the relationship set comprises at least M first relationships, M being a positive integer, and the relationship set comprises at least a set of relationships each of which is between a respective one of M first angles and a first characteristic parameter ratio of the respective first angle to a first predetermined angle, wherein the hardware processor is further configured to:

acquire an information attribute of the first operation information;

acquire a first movement parameter of the operating mode, when the information attribute indicates that the first operation information is second information;

determine a first relationship in the relationship set which matches the first angle in the first operation information; and calibrate the first movement parameter based on the first relationship.

8. The electronic device according to claim 7, wherein the hardware processor is further configured to:

acquire the first angle corresponding to each of the first relationships in the relationship set to generate the M first angles;

determine one of the M first angles which has a minimum difference from the first angle in the first operation information;

determine the first relationship corresponding to the angle which has the minimum difference as the first relationship that matches the first angle in the first operation information;

determine the first characteristic parameter ratio from the first relationship which matches the first angle in the first operation information; and perform a first calculation on the acquired first movement parameter and the first characteristic parameter ratio to calibrate the first movement parameter.

* * * * *